(12) United States Patent
Ko et al.

(10) Patent No.: US 12,050,304 B2
(45) Date of Patent: Jul. 30, 2024

(54) ANTI-REFLECTIVE FILM, POLARIZING PLATE, AND DISPLAY APPARATUS

(71) Applicant: LG CHEM, LTD., Seoul (KR)

(72) Inventors: Kyung Moon Ko, Daejeon (KR); Jinseok Byun, Daejeon (KR); Changoh Kim, Daejeon (KR); Yeongrae Chang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 744 days.

(21) Appl. No.: 17/268,117

(22) PCT Filed: Feb. 24, 2020

(86) PCT No.: PCT/KR2020/002633
§ 371 (c)(1),
(2) Date: Feb. 12, 2021

(87) PCT Pub. No.: WO2020/184865
PCT Pub. Date: Sep. 17, 2020

(65) Prior Publication Data
US 2021/0325569 A1  Oct. 21, 2021

(30) Foreign Application Priority Data
Mar. 12, 2019 (KR) .................... 10-2019-0028248
Feb. 20, 2020 (KR) .................... 10-2020-0020902

(51) Int. Cl.
*G02B 1/11* (2015.01)
*C09D 5/00* (2006.01)
*G02F 1/1335* (2006.01)

(52) U.S. Cl.
CPC ............... *G02B 1/11* (2013.01); *C09D 5/006* (2013.01); *G02F 1/133502* (2013.01)

(58) Field of Classification Search
CPC .. G02B 1/11; G02B 1/111; G02B 1/14; C09D 5/006; G02F 1/133502
See application file for complete search history.

(56) References Cited

U.S. PATENT DOCUMENTS 7,419,707 B2   9/2008  Ando et al.
10,222,510 B2  3/2019  Song et al.
(Continued)

FOREIGN PATENT DOCUMENTS

CN  103765249 A  4/2014
CN  108027456 A  5/2018
(Continued)

OTHER PUBLICATIONS

Partial Supplementary European Search Report dated Aug. 4, 2021, of the corresponding European Patent Application No. 20769060.3, 10 pages.
(Continued)

*Primary Examiner* — Stephone B Allen
*Assistant Examiner* — Adam W Booher
(74) *Attorney, Agent, or Firm* — ROTHWELL, FIGG, ERNST & MANBECK, P.C.

(57) ABSTRACT

The present disclosure relates to an anti-reflective film capable of simultaneously realizing high scratch resistance and antifouling property, and increasing a screen sharpness of a display apparatus, a polarizing plate and a display apparatus including the same.

12 Claims, 1 Drawing Sheet

(a)

(b)

(56) References Cited

U.S. PATENT DOCUMENTS

| | | | |
|---|---|---|---|
| 10,222,512 B2 | 3/2019 | Kobori et al. | |
| 10,627,547 B2 | 4/2020 | Byun et al. | |
| 2004/0156110 A1* | 8/2004 | Ikeyama | B32B 27/18 |
| | | | 359/603 |
| 2005/0038137 A1 | 2/2005 | Yoshihara et al. | |
| 2010/0020398 A1 | 1/2010 | Horio et al. | |
| 2010/0246014 A1 | 9/2010 | Asahi et al. | |
| 2011/0262734 A1 | 10/2011 | Arfsten et al. | |
| 2017/0160435 A1 | 6/2017 | Arfsten et al. | |
| 2017/0307783 A1 | 10/2017 | Hongo et al. | |
| 2018/0194912 A1 | 7/2018 | Kim et al. | |
| 2018/0223113 A1 | 8/2018 | Seo et al. | |
| 2018/0230316 A1 | 8/2018 | Kim et al. | |
| 2018/0364396 A1 | 12/2018 | Jang et al. | |
| 2019/0004214 A1 | 1/2019 | Kim et al. | |
| 2019/0011602 A1* | 1/2019 | Kim | C08J 7/0427 |
| 2019/0025467 A1 | 1/2019 | Byun et al. | |
| 2019/0101670 A1 | 4/2019 | Byun et al. | |
| 2019/0137658 A1 | 5/2019 | Song et al. | |
| 2019/0137659 A1 | 5/2019 | Song et al. | |
| 2019/0154882 A1 | 5/2019 | Byun et al. | |
| 2019/0154883 A1 | 5/2019 | Byun et al. | |

FOREIGN PATENT DOCUMENTS

| | | | |
|---|---|---|---|
| EP | 3299851 A1 | 3/2018 | |
| EP | 3415959 A1 | 12/2018 | |
| EP | 3447543 A1 | 2/2019 | |
| JP | 2004-317734 A | 11/2004 | |
| JP | 2006-145736 A | 6/2006 | |
| JP | 2006-257402 A | 9/2006 | |
| JP | 2010-256880 A | 11/2010 | |
| JP | 2010-277059 A | 12/2010 | |
| JP | 2011-084048 A | 4/2011 | |
| JP | 2011-227489 A | 11/2011 | |
| JP | 2012-505304 A | 3/2012 | |
| JP | 5490487 B2 | 5/2014 | |
| JP | 2015-072429 A | 4/2015 | |
| JP | 2018-533067 A | 11/2018 | |
| JP | 2019-502163 A | 1/2019 | |
| KR | 10-2008-0104357 A | 12/2008 | |
| KR | 10-2012-0128734 A | 11/2012 | |
| KR | 10-2016-0002407 A | 1/2016 | |
| KR | 10-2016-0019367 A | 2/2016 | |
| KR | 10-2017-0036624 A | 4/2017 | |
| KR | 10-2017-0065459 A | 6/2017 | |
| KR | 10-2017-0074883 A | 6/2017 | |
| KR | 10-2017-0105438 A | 9/2017 | |
| KR | 10-2017-0106920 A | 9/2017 | |
| KR | 10-2017-0106923 A | 9/2017 | |
| KR | 10-1781197 B1 | 9/2017 | |
| KR | 10-2018-0012104 A | 2/2018 | |
| KR | 10-2018-0035093 A | 4/2018 | |
| KR | 10-2018-0043687 A | 4/2018 | |
| KR | 10-2018-0086027 A | 7/2018 | |
| KR | 10-2018-0099208 A | 9/2018 | |
| WO | 2003-027189 A1 | 4/2003 | |
| WO | 2012-157682 A1 | 11/2012 | |
| WO | 2016-063915 A1 | 4/2016 | |

OTHER PUBLICATIONS

Cui, et al., "A hydrophobic and abrasin-resistant MgF2 coating with an ultralow refractive index for double-layer broadband antireflective coatings", Journal of Materials Chemistry C, vol. 5, No. 12, Jan. 1, 2017, pp. 3088-3096.

International Search Report issued for International Application No. PCT/KR2020/002633 on Jun. 5, 2020, 4 pages.

* cited by examiner

ANTI-REFLECTIVE FILM, POLARIZING PLATE, AND DISPLAY APPARATUS

CROSS-REFERENCE TO RELATED APPLICATION(S)

This application is a 35 U.S.C. 371 National Phase Entry Application from PCT/KR2020/002633 filed on Feb. 24, 2020, designating the United States, which claims the benefit of Korean Patent Application No. 10-2019-0028248 filed on Mar. 12, 2019 and Korean Patent Application No. 10-2020-0020902 filed on Feb. 20, 2020 in the Korean Intellectual Property Office, the entire contents of which are incorporated herein by reference.

FIELD OF THE INVENTION

The present disclosure relates to an anti-reflective film, a polarizing plate and a display apparatus.

BACKGROUND OF THE INVENTION

In general, a flat panel display device such as a PDP or an LCD is equipped with an anti-reflective film for minimizing the reflection of light incident from the outside. As a method for minimizing the reflection of light, there exist a method (anti-glare: AG coating) in which a filler such as a inorganic fine particle is dispersed in a resin and coated onto a substrate film to impart irregularities; a method (anti-reflection: AR coating) of using the interference of light by forming a plurality of layers having different refractive indexes on a substrate film; or a method for mixing them, etc.

Among them, in the case of the AG coating, the absolute amount of the reflected light is equivalent to that of a general hard coating, but a low reflection effect can be obtained by reducing the amount of light entering the eye using light scattering through irregularities. However, since the AG coating has poor screen sharpness due to the surface irregularities, many studies on AR coating have been conducted recently.

As for a film using the AR coating, a multi-layered structure in which a hard coating layer (high refractive index layer), a low reflective coating layer, and the like are laminated on a light transmissive substrate film has been commercialized. However, in the method of forming a plurality of layers as described above, there is a disadvantage that as the steps of forming each layer are separately performed, the interlayer adhesion (interfacial adhesion) is weak and thus the scratch resistance is lowered.

In addition, previously, a method of adding various nanometer-sized particles (for example, particles of silica, alumina, zeolite, or the like) has been mainly attempted to improve the scratch resistance of the low refractive index layer included in the anti-reflective film. However, when nanometer-sized particles are used as described above, there was a limitation that it is difficult to simultaneously improve scratch resistance while lowering the reflectance of the low refractive index layer, and the antifouling property of the low refractive index layer was greatly reduced due to the nanometer-sized particles.

Therefore, although many researches have been made to reduce the absolute reflection amount of light incident from the outside and to improve the antifouling property together with the scratch resistance of the surface, the degree of improvement in physical properties resulting therefrom is insufficient.

SUMMARY OF THE INVENTION

The present disclosure provides an anti-reflective film capable of simultaneously realizing high scratch resistance and antifouling property, and increasing a screen sharpness of a display apparatus.

The present disclosure also provides a polarizing plate including the above-mentioned anti-reflective film.

The present disclosure further provides a display apparatus including the above-mentioned anti-reflective film and providing high screen sharpness.

Provided herein is an anti-reflective film comprising a hard coating layer; and a low refractive index layer containing a fluorine-containing compound, wherein a content of fluorine atoms existing on the surface of the low refractive index layer is more than 8.0 atomic %, and wherein a surface area difference percentage (SADP) of one surface of the low refractive index layer is 20% or less.

Also provided herein is a polarizing plate comprising the aforementioned anti-reflective film.

Further provided herein is a display apparatus comprising the aforementioned anti-reflective film.

DETAILED DESCRIPTION OF THE INVENTION

Hereinafter, an anti-reflective film according to a specific embodiment of the present disclosure, and a polarizing plate and a display apparatus including the same will be described in more detail.

As used herein, the low refractive index layer may refer to a layer having a low refractive index, for example, a layer showing a refractive index of about 1.2 to 1.6 at a wavelength of 550 nm.

As used herein, the hollow inorganic nanoparticle refers to a particle having a form in which an empty space exists on the surface and/or the inside of the inorganic nanoparticles.

As used herein, the (meth)acrylate refers to including both an acrylate and a methacrylate.

As used herein, the (co)polymer refers to including both a co-polymer and a homo-polymer.

As used herein, the photopolymerizable compound collectively refers to a polymer compound polymerized by irradiation with light, for example, by irradiation with visible light or ultraviolet light.

As used herein, the fluorine-containing compound refers to a compound containing at least one fluorine element in the compound.

According to one embodiment of the present disclosure, an anti-reflective film is provided, including: a hard coating layer; and a low refractive index layer containing a fluorine-containing compound, wherein a content of fluorine atoms existing on the surface of the low refractive index layer is more than 8.0 atomic %, and wherein a surface area difference percentage (SADP) of one surface of the low refractive index layer is 20% or less.

Thus, the present inventors have proceeded with research into an anti-reflective film, and found through experiments that an anti-reflective film including: a hard coating layer; and a low refractive index layer containing a fluorine-containing compound, wherein a content of fluorine atoms existing on the surface of the low refractive index layer is more than 8.0 atomic %, and wherein a surface area difference percentage (SADP) of one surface of the low refractive index layer is 20% or less, can simultaneously realize high scratch resistance and antifouling property and has a screen sharpness of a display apparatus, thereby completing the present disclosure.

Further, the anti-reflective film has excellent scratch resistance and high antifouling property while increasing a screen sharpness of a display apparatus, and thus can be easily applied to the manufacturing process of the display apparatus or the polarizing plate, without a particular limitation.

Specifically, in the anti-reflective film according to one embodiment of the present disclosure, the surface area difference percentage (SADP) of one surface of the low refractive index layer may be 20% or less, 0.1 to 20%, 0.8 to 19%, 1 to 18%, 1.5 to 17%, or 2 to 16%.

The surface area difference percentage is an index indicating the three-dimensional surface roughness of one surface of the low refractive index layer, and may be defined by the following Equation 1.

Surface area difference percentage (%)=((three-dimensional area−two-dimensional area)/(two-dimensional area))×100 [Equation 1]

Specifically, the surface area difference percentage can be calculated by dividing the difference between the three-dimensional surface area and the two-dimensional surface area by the two-dimensional area and then multiplying it by 100, and this can be achieved using an atomic force microscope device. More specifically, the two-dimensional area corresponds to an area of a measurement object, for example, a product of a horizontal length and a vertical length when the measurement object is square. The three-dimensional area can be confirmed through a measurement value obtained after forming a three-dimensional image from a profile obtained through an atomic force microscope.

Further, the surface area difference percentage may affect the antifouling property of the anti-reflective film, and the surface area difference percentage may be controlled, for example, by the content of hollow inorganic particles contained in the low refractive index layer.

Specifically, the surface area difference percentage (SADP) may be 20% or less, 0.1 to 20%, 0.8 to 19%, 1 to 18%, 1.5 to 17%, or 2 to 16%. If the surface area difference percentage of the anti-reflective film exceeds 20%, the antifouling effect cannot be obtained. In addition, although it corresponds to the content to be described later, if the surface area difference percentage exceeds 20%, it is not possible to exhibit the antifouling property even if the content of fluorine contained in the surface of the low refractive index layer increases.

Meanwhile, it is possible to measure the centerline average roughness (Ra) of the anti-reflective film through the atomic force microscope, and the centerline average roughness (Ra) may be 10 nm or less, 8 to 0.1 nm, 7 to 0.3 nm, 5 to 0.5 nm, or 4 to 0.6 nm. If the centerline average roughness (Ra) exceeds 10 nm, the antifouling effect may not be obtained.

The anti-reflective film according to the one embodiment may include a hard coating layer and a low refractive index layer having a fluorine-containing compound. Not only the fluorine element contained in the fluorine-containing compound can significantly reduce the amount of contaminants transferred to the anti-reflective film, but also it can prevent the phenomenon that the transferred contaminants remain on the surface, and it has a feature that the contaminants themselves can be easily removed.

Therefore, it is preferable that fluorine atoms capable of easily removing contaminants themselves on the surface of the low refractive index layer are contained in a large amount. For example, the content of fluorine atoms existing on the surface of the low refractive index layer may be more than 8.0 atomic %, 8.2 atomic % or more, 8.4 atomic % or more, 8.6 atomic % or more, 8.8 atomic % or more, 8.9 atomic % or more, 9.0 atomic % or more, 9.5 atomic % or more, or 10 atomic % or more. If the content of fluorine existing on the surface of the low refractive index layer is 8.0 atomic % or less, the antifouling effect cannot be obtained. However, if the content of fluorine is too high, as the content of other atoms such as silicon, carbon, etc. decreases, the effects related to low average reflectance, excellent scratch resistance and sharpness cannot be realized, and a defective coating phenomenon may occur due to imbalance of surface energy. The content of fluorine existing on the surface of the low refractive index layer may be 50 atomic % or less, 40 atomic % or less, 30 atomic % or less, or 20 atomic % or less. Meanwhile, the content of fluorine may be the content of fluorine element relative to the total atomic content of elements existing within 10 nm thickness in the thickness direction of the low refractive index layer from one surface of the low refractive index layer (e.g., one surface of the low refractive index layer in contact with the air layer).

The content of fluorine existing on the surface of the low refractive index layer may affect the antifouling property of the anti-reflective film, and the content of fluorine may be controlled by the content of the fluorine-containing compound contained in the low refractive index layer.

In addition, even if the content of fluorine existing on the surface of the low refractive index layer exceeds 8.0 atomic % by controlling the content of the fluorine-containing compound contained in the low refractive index layer, it may be difficult to achieve an excellent antifouling effect if the condition in which the surface area difference percentage of one surface of the low refractive index layer is 20% or less is not satisfied.

In the fluorine-containing compound, one or more photoreactive functional groups may be included or substituted, and the photoreactive functional group refers to a functional group capable of participating in a polymerization reaction by irradiation of light (for example, by irradiation of visible light or ultraviolet light) or heating. The photoreactive functional group may include various functional groups known to be able to participate in a polymerization reaction by irradiation of light or heating. Specific examples thereof may include a (meth)acrylate group, an epoxide group, a vinyl group, and a thiol group.

Further, in the process of forming the low refractive index layer and anti-reflective film, the reactive functional group included in the fluorine-containing compound acts as cross-linkers, thereby increasing physical durability, scratch resistance, and thermal stability possessed by the low refractive index layer and anti-reflective film.

The fluorine-containing compound may have a weight average molecular weight (weight average molecular weight converted in terms of polystyrene measured by GPC method) of 1,000 to 200,000, 2,000 to 100,000, or 3,000 to 5,000. If the weight average molecular weight of the fluorine-containing compound is too small, the fluorine-containing compound may not be uniformly and effectively arranged on the surface of the low refractive index layer and may be positioned inside, whereby the antifouling property possessed by the surface of the low refractive index layer and anti-reflective film may be deteriorated and the cross-linking density inside the low refractive index layer and anti-reflective film may be lowered, thus deteriorating mechanical properties such as total strength or scratch resistance, etc. Further, if the weight average molecular weight of the fluorine-containing compound is too high, the haze of the low refractive index layer and anti-reflective film may increase or the light transmittance may be lowered, and the strength of the low refractive index layer and anti-reflective film may also be deteriorated.

Specifically, the fluorine-containing compound may include one or more selected from the group consisting of: i) an aliphatic compound or an aliphatic cyclic compound in which at least one reactive functional group is substituted and at least one fluorine is substituted for at least one carbon; ii) a heteroaliphatic compound or heteroaliphatic cyclic compound in which at least one reactive functional group is substituted, at least one hydrogen is substituted with fluorine and at least one carbon is substituted with silicon; iii) a polydialkylsiloxane-based polymer (for example, a polydimethylsiloxane-based polymer) in which at least one reactive functional group is substituted and at least one fluorine is substituted for at least one silicon; and iv) a polyether compound in which at least one reactive functional group is substituted and at least one hydrogen is substituted with fluorine.

For example, the fluorine-containing compound is a compound obtained by polymerizing perfluoropolyether, and acrylate and siloxane may be substituted with a functional group.

The content of the fluorine-containing compound relative to the total weight of the low refractive index layer may be 2 to 9% by weight, 2 to 8% by weight, or 3 to 7% by weight. The fluorine-containing compound plays a role of imparting slip property to the surface of the low refractive index layer and thus improving antifouling property. When the content of the fluorine-containing compound is too small, the antifouling effect cannot be obtained, and when the content of the fluorine-containing compound is too high, the content of the fluorine-containing compound is relatively high on the surface of the low refractive index layer, and thus, the conversion rate at which the photopolymerizable compound is converted to the (co)polymer on the surface of the low refractive index layer may be reduced.

The content of fluorine atom contained in the fluorine-containing compound may be 1 to 60% by weight, 10 to 55% by weight, 20 to 50% by weight, or 35 to 45% by weight. If the content of fluorine in the fluorine-containing compound is too small, the fluorine component is not sufficiently arranged on the surface of the low refractive index layer and thus, it is difficult to sufficiently secure physical properties such as antifouling property. Further, if the content of fluorine in the fluorine-containing compound is too large, the surface characteristics of the low refractive index layer may be deteriorated or the occurrence rate of defective products may increase during a subsequent process for obtaining a final product.

The fluorine-containing compound may further include silicon or a silicon compound. That is, the fluorine-containing compound may optionally contain silicon or a silicon compound therein, and specifically, the content of silicon in the fluorine-containing compound may be 0.1% to 20% by weight.

The content of silicon or a silicon compound respectively contained in the fluorine-containing compound can also be confirmed through commonly known analysis methods, for example, ICP [Inductively Coupled Plasma] analysis method.

The silicon included in the fluorine-containing compound may increase compatibility with other components included in the low refractive index layer according to the embodiment, and thus may prevent the generation of haze in the finally prepared low refractive index layer, thereby increasing transparency, and furthermore, may improve the slip property of the surface of the finally prepared low refractive index layer or anti-reflective film, thereby increasing scratch resistance.

Meanwhile, if the content of silicon in the fluorine-containing compound becomes too high, the low refractive index layer or anti-reflective film may not have sufficient light transmittance or anti-reflective performance and the anti-pollution property of the surface may be deteriorated.

The low refractive index layer of the anti-reflective film according to the one embodiment may further include hollow inorganic particles. Meanwhile, the hollow inorganic particles mean particles having a form in which empty voids are present on the surface and/or inside thereof.

The hollow inorganic nanoparticles may have a diameter of 10 to 200 nm, 15 to 150 nm, 20 to 130 nm, 30 to 110 nm or 40 to 100 nm. If the diameter of the hollow inorganic particles is less than 10 nm, the amount of air contained in the hollow inorganic particles themselves becomes small and thus, it may be difficult to implement a low refractive index. If the diameter of the hollow inorganic particles exceeds 200 nm, excessively large irregularities are formed on the surface of the low refractive index layer, making it difficult to implement excellent antifouling properties and scratch resistance, and further, there may be a problem that the thickness of the low refractive index layer is inevitably increased.

Specific examples of the hollow inorganic particles include hollow silica particles. The hollow silica particles may include a predetermined functional group substituted on the surface in order to be more easily dispersed in an organic solvent. Examples of the organic functional group that can be substituted on the surface of the hollow silica particles are not particularly limited, and for example, a (meth)acrylate group, a vinyl group, a hydroxyl group, an amine group, an allyl group, an epoxy group, a hydroxyl group, an isocyanate group, an amine group, fluorine, or the like may be substituted on the surface of the hollow silica.

The content of the hollow inorganic particles relative to the total weight of the low refractive index layer may be 29 to 60% by weight, 30 to 55% by weight, or 35 to 50% by weight. If a content of the hollow inorganic particles is less than 29% by weight, it may be difficult to obtain a low-reflection effect, and if a content of the hollow inorganic particles exceeds 60% by weight, too many irregularities are formed on the surface of the low refractive index layer to increase the surface area, so it may be difficult to have excellent antifouling property.

In addition, as described above, the content V of the hollow inorganic particles is 29 to 60% by weight relative to the total weight of the low refractive index layer, and the content F of the fluorine-containing compound is 2 to 9% by weight relative to the total weight of the low refractive index layer, and at the same time, the content F of the fluorine-containing compound and the content V of the hollow inorganic particles can satisfy the following Equation 2.

$$F \geq 0.26V - 6.11 \qquad \text{[Equation 2]}$$

Consequently, the anti-reflective film including the low refractive index layer can implement excellent antifouling property and scratch resistance, and exhibits an average reflectance of 2% or less in a visible light wavelength range of 380 nm to 780 nm, and thus, can enhance the screen sharpness of the display apparatus.

Meanwhile, when Equation 2 is expressed as a two-dimensional graph, it is a linear inequality in which x-axis is V and y-axis is F, and slope is 0.26 and Y-intercept is −6.11. Because the slope of Equation 2 is 0.26, it can be confirmed that the content of the hollow inorganic particles has a greater influence on the antifouling property and scratch resistance of the anti-reflective film as compared with the content of the fluorine-containing compound. Further, although the anti-reflective film satisfies the range of the content V of the hollow inorganic particles and the content F of the fluorine-containing compound described above, because of satisfying Equation 2, the high scratch resistance and antifouling property can be simultaneously achieved and also the screen sharpness of a display apparatus including the same can be improved. If the anti-reflective film does not satisfy Equation 2, there is a problem that antifouling property and/or scratch resistance are deteriorated, or high average reflectance is exhibited.

As the hollow inorganic particles, a hollow inorganic particle whose surface is coated with a fluorine-containing compound having a reactive functional group may be used can be used alone. Alternatively, hollow inorganic particles whose surface is coated with a fluorine-containing compound having a reactive functional group may be used in combination with hollow inorganic particles whose surface is not coated. When the surface of the hollow inorganic particles is coated with a fluorine-containing compound having a reactive functional group, the surface energy may be further reduced, whereby the antifouling property of the low refractive index layer can be improved, and the durability and scratch resistance of the low refractive index layer be further improved.

As a method of coating the surface of the hollow inorganic particles with a fluorine-containing compound having a reactive functional group, a conventionally known particle coating method, polymerization method, and the like may be used without particular limitation. For example, the fluorine-containing compound having a reactive functional group may be bonded to the surface of the hollow inorganic particles via hydrolysis and a condensation reaction by subjecting the hollow inorganic particles and the fluorine-containing compound having a reactive functional group to a sol-gel reaction in the presence of water and a catalyst.

The low refractive index layer may further include solid inorganic nanoparticles. The solid inorganic nanoparticles refer to particles having a form in which an empty space is not present in the inside thereof. By including solid inorganic particles in the low refractive index layer, even if a smaller amount of hollow inorganic particles is used, the reflectance of the anti-reflective film can be lowered and the scratch resistance and antifouling property can be improved. The solid inorganic particles may have a diameter of 0.5 to 100 nm, 1 to 50 nm, 2 to 30 nm, or 5 to 20 nm.

Meanwhile, each of the solid inorganic particles and the hollow inorganic particles may contain at least one reactive functional group selected from the group consisting of a (meth)acrylate group, an epoxide group, a vinyl group and a thiol group on the surface. As each of the solid inorganic particles and the hollow inorganic particles contains the above-described reactive functional groups on the surface, the low refractive index layer may have a higher degree of crosslinking, and thus, more improved scratch resistance and antifouling property may be secured.

The content of the solid inorganic particles may be 1 to 50 parts by weight, 2 to 40 parts by weight, 3 to 35 parts by weight, or 5 to 30 parts by weight with respect to 100 parts by weight of the hollow inorganic particles When the hollow inorganic particles are excessively added, the scratch resistance or abrasion resistance of the coating film may be reduced due to a decrease in the content of binder.

The low refractive index layer of the anti-reflective film according to the one embodiment may further include a (co)polymer of the photopolymerizable compound.

The photopolymerizable compound forming a (co)polymer of the photopolymerizable compound may include a monomer or an oligomer containing a (meth)acrylate or a vinyl group. Specifically, the photopolymerizable compound may include a monomer or an oligomer containing one or more, or two or more, or three or more of (meth)acrylate groups or vinyl groups.

Specific examples of the monomers or oligomers containing (meth)acrylate may include pentaerythritol tri(meth)acrylate, pentaerythritol tetra(meth)acrylate, dipentaerythritol penta(meth)acrylate, dipentaerythritol hexa(meth)acrylate, tripentaerythritol hepta(meth)acrylate, trilene diisocyanate, xylene diisocyanate, hexamethylene diisocyanate, trimethylol propane tri(meth)acrylate, trimethylolpropane polyethoxy tri(meth)acrylate, trimethylolpropane trimethacrylate, ethylene glycol dimethacrylate, butanediol dimethacrylate, hexaethyl methacrylate, butyl methacrylate, or mixtures of two or more kinds thereof, or urethane modified acrylate oligomers, epoxide acrylate oligomers, etheracrylate oligomers, dendritic acrylate oligomers, or mixtures of two or more kinds thereof. In this case, the molecular weight of the oligomer may be 1000 to 10,000.

Specific examples of the monomers or oligomers containing vinyl groups may include divinylbenzene, styrene, or paramethylstyrene.

Although the content of the (co)polymer of the photopolymerizable compound relative to the total weight of the low refractive index layer is not limited thereto, but considering the mechanical properties of the finally prepared low refractive index layer or anti-reflective film, the content of the (co)polymer of the photopolymerizable compound may be 10 to 80% by weight, 15 to 70% by weight, 20 to 60% by weight, or 30 to 50% by weight. If the content of the (co)polymer of the photopolymerizable compound is less than 10% by weight, an empty space is formed between inorganic particles and the periodicity of the arrangement between particles is eliminated, which can induce a decrease in the packing density of the particles, whereby the stress distribution does not occur smoothly, and thus the scratch resistance can be decreased. When the content of the (co)polymer of the photopolymerizable compound exceeds 80% by weight, the ratio of conversion of the photopolymerizable compound to the (co)polymer may be lowered.

The low refractive index layer may include a polysilsesquioxane substituted with one or more reactive functional group. The polysilsesquioxane substituted with one or more reactive functional groups can enhance the mechanical properties, for example, scratch resistance, of the low refractive index layer since a reactive functional group is present on the surface, and improve the appearance characteristics such as the average reflectance and the color while enhancing the alkali resistance of the low refractive index layer, unlike the case where fine particles of silica, alumina, zeolite, etc. known in the past are used.

The polysilsesquioxane may be represented by $(RSiO_{1.5})_n$ (where n is 4 to 30, or 8 to 20), and may have various structures such as a random type, a ladder type, a cage type, a partial cage type, etc. For example, in order to enhance the physical properties and quality of the low refractive index layer and the anti-reflective film, a polyhedral oligomeric silsesquioxane having a cage structure, in which one or more reactive functional groups are substituted, may be used as the polysilsesquioxane substituted with one or more reactive functional groups.

Further, the polyhedral oligomeric silsesquioxane having a cage structure, in which one or more functional groups are substituted, may include 8 to 20 silicon atoms in a molecule.

In addition, at least one silicon atom of the polyhedral oligomeric silsesquioxane having a cage structure may be substituted with a reactive functional group, and further, the silicon atoms in which reactive functional groups are not substituted may be substituted with the unreactive functional groups described above.

As at least one silicon atom of the polyhedral oligomeric silsesquioxane having a cage structure is substituted with a reactive functional group, the mechanical properties of the low refractive index layer and the binder resin may be enhanced. Further, as the remaining silicon atoms are substituted with non-reactive functional groups, steric hindrance appears on the molecular structure, which significantly decreases the frequency or probability of exposure of the siloxane bond (—Si—O—) to the outside, and thus it is possible to enhance the alkali resistance of the low refractive index layer and the binder resin.

The reactive functional group substituted on the polysilsesquioxane may include at least one functional group selected from the group consisting of an alcohol, an amine, a carboxylic acid, an epoxide, an imide, a (meth)acrylate, a nitrile, a norbornene, an olefin (ally, cycloalkenyl, vinyldimethylsilyl, etc.), polyethylene glycol, a thiol, and a vinyl group, and may preferably be an epoxide or a (meth)acrylate.

More specific examples of the reactive functional group include (meth)acrylates, alkyl(meth)acrylates having 1 to 20 carbon atoms, cycloalkyl epoxides having 3 to 20 carbon atoms, and cycloalkane epoxides having 1 to 10 carbon atoms. The alkyl(meth)acrylate means that the other part of 'alkyl' that is not bonded to (meth)acrylate is a bonding position, the cycloalkyl epoxide means that the other part of 'cycloalkyl' that is not bonded to an epoxide is a bonding position, and the alkyl cycloalkane epoxide means that the other part of 'alkyl' that is not bonded to a cycloalkane epoxide is a bonding position.

On the other hand, the polysilsesquioxane substituted with one or more reactive functional groups may further include at least one unreactive functional group selected from the group consisting of a linear or branched alkyl group having 1 to 20 carbon atoms, a cyclohexyl group having 6 to 20 carbon atoms, and an aryl group having 6 to 20 carbon atoms, in addition to the above-described reactive functional group. As such, as the reactive functional groups and the non-reactive functional groups are surface-substituted in the polysilsesquioxane, the siloxane bond (—Si—O—) in the polysilsesquioxane substituted with one or more reactive functional groups is located inside the molecule and is not exposed to the outside, thereby further enhancing the alkali resistance and scratch resistance of the low refractive index layer and the anti-reflective film.

Examples of the polyhedral oligomeric silsesquioxane (POSS) having a cage structure in which at least one reactive functional group is substituted include: a POSS in which at least one alcohol is substituted, such as TMP diolisobutyl POSS, cyclohexanediol isobutyl POSS, 1,2-propanediollsobutyl POSS, octa(3-hydroxy-3 methylbutyldimethylsiloxy) POSS, etc.; a POSS in which at least one amine is substituted, such as aminopropylisobutyl POSS, aminopropylisooctyl POSS, aminoethylaminopropyl isobutyl POSS, N-phenylaminopropyl POSS, N-methylaminopropyl isobutyl POSS, octaammonium POSS, aminophenylcyclohexyl POSS, aminophenylisobutyl POSS, etc.; a POSS in which at least one carboxylic acid is substituted, such as maleamic acid-cyclohexyl POSS, maleamic acid-isobutyl POSS, octamaleamic acid POSS, etc; a POSS in which at least one epoxide is substituted, such as epoxycyclohexylisobutyl POSS, epoxycyclohexyl POSS, glycidyl POSS, glycidylethyl POSS, glycidylisobutyl POSS, glycidylisooctyl POSS, etc.; a POSS in which at least one imide is substituted, such as POSS maleimide cyclohexyl, POSS maleimide isobutyl, etc.; a POSS in which at least one (meth)acrylate is substituted, such as acryloisobutyl POSS, (meth)acrylisobutyl POSS, (meth)acrylate cyclohexyl POSS, (meth)acrylate isobutyl POSS, (meth)acrylate ethyl POSS, (meth)acrylethyl POSS, (meth)acrylate isooctyl POSS, (meth)acrylisooctyl POSS, (meth)acrylphenyl POSS, (meth)acryl POSS, acrylo POSS, etc.; a POSS in which at least one nitrile group is substituted, such as cyanopropylisobutyl POSS, etc.; a POSS in which at least one norbornene is substituted, such as norbornenylethylethyl POSS, norbornenylethylisobutyl POSS, norbornenylethyl disilanoisobutyl POSS, trisnorbornenylisobutyl POSS, etc.; a POSS in which at least one vinyl group is substituted, such as allylisobutyl POSS, monovinylisobutyl POSS, octacyclohexenyldimethylsilyl POSS, octavinyldimethylsilyl POSS, octavinyl POSS, etc.; a POSS in which at least one olefin is substituted, such as allylisobutyl POSS, monovinylisobutyl POSS, octacyclohexenyldimethylsilyl POSS, octavinyldimethylsilyl POSS, octavinyl POSS, etc.; a POSS in which a PEG having 5 to 30 carbon atoms is substituted; or a POSS in which at least one thiol group is substituted, such as mercaptopropylisobutyl POSS, mercaptopropylisooctyl POSS, etc.

The content of the polysilsesquioxane substituted with one or more reactive functional groups relative to the total weight of the low refractive index layer may be 1 to 20% by weight, 3 to 15% by weight, or 5 to 10% by weight. When the content of the part derived from the polysilsesquioxane substituted with one or more reactive functional groups is too small, it may be difficult to sufficiently ensure the scratch resistance of the low refractive index layer. Further, even when the content of the part derived from the polysilsesquioxane substituted with one or more reactive functional groups is too high compared to the part derived from the photopolymerizable compound in the binder resin, transparency of the low reflective index layer or the anti-reflective film may be deteriorated, and scratch resistance may be rather deteriorated.

Meanwhile, the low refractive index layer may further include the cross-linked polymer between a photopolymerizable compound, the fluorine-containing compound, and the polysilsesquioxane substituted with one or more reactive functional groups.

The low refractive index layer may be obtained by coating a photocurable coating composition including a photopolymerizable compound, a fluorine-containing compound, and a polysilsesquioxane substituted with one or more reactive functional groups onto a substrate, and photocuring the coated product. Consequently, the low refractive index layer may include a cross-linked polymer between the photopolymerizable compound, the fluorine-containing compounds, and the polysilsesquioxane substituted with one or more reactive functional groups.

In addition, the photocurable coating composition may further include a photoinitiator. Thus, in the low refractive index layer prepared from the above-mentioned photocurable coating composition, the photopolymerization initiator may remain.

The photopolymerization initiator can be used without particular limitation as long as it is a compound known to be usable in a photocurable resin composition, and specifically, a benzophenone-based compound, an acetophenone-based compound, a biimidazole-based compound, a triazine-based compound, an oxime-based compound, or mixture of two or more kinds thereof may be used.

The photopolymerization initiator may be used in the content of 1 to 100 parts by weight, or 5 to 90 parts by weight, or 10 to 80 parts by weight, or 20 to 70 parts by weight, or 30 to 60 parts by weight with respect to 100 parts by weight of the photopolymerizable compound. If the content of the photopolymerization initiator is too small, materials that are not cured in the photocuring step and remain may be generated. If the content of the photopolymerization initiator is too high, a non-reacted initiator may remain as an impurity, and cross-linking density may be lowered, so that the mechanical properties of the prepared film may be deteriorated, or the reflectance may be significantly increased.

The photocurable coating composition may further include an organic solvent. Non-limiting examples of the organic solvent may include ketones, alcohols, acetates, ethers, and mixtures of two or more kinds thereof.

Specific examples of the organic solvent may include ketones such as methyl ethyl ketone, methyl isobutyl ketone, acetylacetone, isobutyl ketone, etc.; alcohols such as methanol, ethanol, n-propanol, i-propanol, n-butanol, i-butanol, t-butanol, etc.; acetates such as ethylacetate, i-propylacetate, polyethylene glycol monomethylether acetate, etc.; ethers such as tetrahydrofuran, propylene glycol monomethyl ether, etc.; or mixtures of two or more kinds thereof.

The organic solvent may be added when mixing respective components included in the photocurable coating composition, or then respective components may be included in the photocurable coating composition while being dispersed in or mixed with the organic solvent. If the content of the organic solvent in the photocurable coating composition is too small, flowability of the photocurable coating composition may be deteriorated, thus generating defects such as a stripe, etc. in the finally prepared film. Further, when the organic solvent is excessively added, the solid content may decrease, thus coating and film formation may not be sufficiently achieved, and the physical properties or surface characteristics of the film may be deteriorated, and defects may be generated in the process of drying and curing. Thereby, the photocurable coating composition may include an organic solvent such that the total solid concentration of the included components may become 1% by weight to 50% by weight, or 2% by weight to 20% by weight.

Meanwhile, methods and apparatuses which are commonly used for coating the photocurable coating composition can be used without particular limitations, and for example, bar coating such as using a Meyer bar, etc., gravure coating, 2 roll reverse coating, vacuum slot die coating, 2 roll coating, etc. may be used.

In the step of photocuring the photocurable coating composition, UV or visible light of a 200 to 400 nm wavelength may be irradiated, wherein the exposure amount may preferably be 100 to 4000 mJ/cm$^2$. The exposure time is not particularly limited, and may be appropriately changed according to the exposure apparatus used, the wavelength of irradiated light rays, or the exposure amount.

Further, in the step of photocuring the photocurable coating composition, nitrogen purging, etc. may be conducted so as to apply a nitrogen atmosphere condition.

Meanwhile, as the hard coating layer, commonly known hard coating layers may be used without particular limitations.

One example of the hard coating layer may include a hard coating layer including a binder resin including a photocurable resin; and organic or inorganic fine particles dispersed in the binder resin.

The photocurable resin included in the hard coating layer may be a polymer of photocurable compounds capable of inducing a polymerization reaction if light such as UV, etc. is irradiated, which is commonly known in the art. Specifically, the photocurable resin may include one or more selected from the group consisting of: reactive acrylate oligomers such as a urethane acrylate oligomer, an epoxide acrylate oligomer, a polyester acrylate, and a polyether acrylate; and multifunctional acrylate monomers such as dipentaerythritol hexaacrylate, dipentaerythritol hydroxy pentaacrylate, pentaerythritol tetraacrylate, pentaerythritol triacrylate, trimethylene propyl triacrylate, propoxylated glycerol triacrylate, trimethylpropane ethoxy triacrylate, 1,6-hexanediol acrylate, propoxylated glycerol triacrylate, tripropylene glycol diacrylate, and ethylene glycol diacrylate.

Although the particle diameter of the organic or inorganic fine particles is not particularly limited, for example, the organic fine particles may have a particle diameter of 1 to 10 μm, and the inorganic fine particles may have a particle diameter of 1 nm to 500 nm, or 1 nm to 300 nm.

Further, although specific examples of the organic or inorganic fine particles included in the hard coating film are not particularly limited, for example, the organic or inorganic fine particles may be organic fine particles selected from the group consisting of acryl-based resin particles, styrene-based resin particles, epoxide resin particles, and nylon resin particles, or inorganic fine particles selected from the group consisting of silicon oxide, titanium dioxide, indium oxide, tin oxide, zirconium oxide, and zinc oxide.

The binder resin of the hard coating layer may further include a high molecular weight (co)polymer with a weight average molecular weight of 10,000 or more, 13,000 or more, 15,000 to 100,000, or 20,000 to 80,000. The high molecular weight (co)polymer may be one or more selected from the group consisting of a cellulose-based polymer, an acryl-based polymer, a styrene-based polymer, an epoxide-based polymer, a nylon-based polymer, a urethane-based polymer, and a polyolefin-based polymer.

Meanwhile, another example of the hard coating film may include an organic polymer resin of a photocurable resin; and an antistatic agent dispersed in the organic polymer resin.

The antistatic agent may be a quaternary ammonium salt compound; a pyridinium salt; a cationic compound having 1 to 3 amino groups; anionic compounds such as sulfonate bases, sulfate ester bases, phosphate ester bases, and phosphonate bases; amphoteric compounds such as amino acid-based or aminosulfate ester-based compounds; non-ionic compounds such as amino alcohol-based compounds, glycerin-based compounds, and polyethylene glycol-based compounds; organometallic compounds such as metal alkoxide compounds including tin, titanium, and the like; metal chelate compounds such as acetylacetonate salts of the organometallic compounds; reactants or high-molecular compounds of two or more types of the above compounds; or mixtures of two or more types of the above compounds.

Here, the quaternary ammonium salt compound may be a compound having at least one quaternary ammonium salt group in the molecule, and a low molecular type or a high molecule type may be used without limitation.

In addition, a conductive polymer and metal oxide fine particles may be used as the antistatic agent. As the conductive polymers, aromatic conjugated poly(paraphenylene), heterocyclic conjugated polypyrrole, polythiophene, aliphatic conjugated polyacetylene, heteroatom-containing conjugated polyaniline, mixed conjugated poly (phenylenevinylene), multi-chain conjugated compounds that are conjugated systems with multiple conjugated chains in the molecule, and conductive complexes that are obtained by graft or block polymerization of the above conjugated polymer chains to saturated polymers, may be mentioned. Further, as the metal oxide fine particles, zinc oxide, antimony oxide, tin oxide, cerium oxide, indium tin oxide, indium oxide, aluminum oxide, antimony-doped tin oxide, aluminum-doped zinc oxide, and the like, may be mentioned.

The hard coating layer including an organic polymer resin of the photopolymerizable resin; and an antistatic agent dispersed in the organic polymer resin may further include at least one compound selected from the group consisting of an alkoxysilane-based oligomer and a metal alkoxide-based oligomer.

The alkoxysilane-based compound may be one that is conventional in the relevant art, but preferably, it may be at least one compound selected from the group consisting of tetramethoxysilane, tetraethoxysilane, tetraisopropoxysilane, methyltrimethoxysilane, methyltriethoxysilane, methacryloxypropyltrimethoxysilane, glycidoxypropyl trimethoxysilane, and glycidoxypropyl triethoxysilane.

In addition, the metal alkoxide-based oligomer can be prepared through a sol-gel reaction of a composition including a metal alkoxide-based compound and water. The sol-gel reaction can be carried out by a method similar to the above-described method for preparing an alkoxysilane-based oligomer. However, since the metal alkoxide-based compound may rapidly react with water, the sol-gel reaction may be conducted by diluting the metal alkoxide-based compound in an organic solvent, and then slowly dripping water thereto. At this time, in consideration of the reaction efficiency or the like, it is preferable that the molar ratio of the metal alkoxide-based compound to water (based on metal ions) is controlled within a range of 3 to 170.

Here, the metal alkoxide-based compound may be one or more compounds selected from the group consisting of titanium tetra-isopropoxide, zirconium isopropoxide, and aluminum isopropoxide.

Meanwhile, the anti-reflective film according to the one embodiment may further include a light transmissive substrate located on one surface of the hard coating layer so as to face the low refractive index layer.

The light transmissive substrate may be a transparent film having a light transmittance of 90% or more and a haze of 1% or less. Further, the light transmissive substrate may include one or more selected from the group consisting of a cyclic olefin-based polymer film, a poly(meth)acrylate-based film, a polycarbonate film, a triacetyl cellulose (TAC) film, a polynorbornene film, a polyester film and a polyethylene terephthalate (PET) film. Further, the thickness of the light transmissive substrate may be 10 to 300 μm in consideration of productivity and the like, but is not limited thereto.

Specifically, the light transmissive substrate may have a retardation (Rth) in the thickness direction of 3000 nm or more, 4,000 to 50,000 nm, or 5,000 to 40,000 nm as measured at the wavelength of 400 nm to 800 nm. Specific examples of such a light transmissive substrate include a uniaxially stretched polyethylene terephthalate film and a biaxially stretched polyethylene terephthalate film. When the retardation (Rth) in the thickness direction of the light transmissive substrate is less than 3000 nm, a rainbow phenomenon due to interference of visible rays can be generated.

The retardation (Rth) in the thickness direction can be confirmed by a commonly known measurement method and measurement apparatus. For example, the retardation (Rth) in the thickness direction can be determined using a measuring apparatus manufactured by AXOMETRICS, Inc. under the trade name of "AxoScan", and the like.

For example, the retardation (Rth) in the thickness direction can be determined by: inputting a value of a refractive index (589 nm) of the light transmissive substrate film into the measuring apparatus, then measuring the thickness-direction retardation of the light transmissive substrate film by using light at a wavelength of 590 nm under conditions of a temperature of 25° C. and humidity of 40%; and converting the measured value of the thickness-direction retardation thus determined (the value is measured according to the automatic measurement (automatic calculation) of the measuring apparatus) into a retardation value per 10 μm of thickness of the film. In addition, the size of the light transmissive substrate as the measurement sample is not particularly limited, as long as it is larger than a light measurement unit (diameter: about 1 cm) of a stage of the measuring apparatus. However, the size may be a length of 76 mm, a width of 52 mm, and a thickness of 13 μm.

The value of the "refractive index (589 nm) of the light transmissive substrate" utilized for measuring the thickness-direction retardation (Rth) can be determined by: forming an unstretched film including the same kind of resin film as the light transmissive substrate for forming the film to be measured for the retardation, and then measuring the unstretched film as a measurement sample (further, in the case where the film to be measured is an unstretched film, the film can be directly used as the measurement sample) for the refractive index for light at 589 nm in an in-plane direction (the direction perpendicular to the thickness direction) of a measurement sample by using a refractive index-measuring apparatus (manufactured by Atago Co., Ltd. under the trade name of "NAR-1T SOLID") as a measuring apparatus under a light source of 589 nm and a temperature condition of 23° C.

The anti-reflective film according to the one embodiment exhibits relatively low reflectance and total haze values, thereby realizing high light transmittance and excellent optical properties. Specifically, the total haze of the anti-reflective film may be 0.45% or less, 0.05 to 0.45%, or 0.10% to 0.25%. Further, the anti-reflective film may have an average reflectance of 2.0% or less, 1.5% or less, 1.0% or less, or 0.1% to 0.10%, 0.40% to 0.80%, or 0.54% to 0.69% in the visible light wavelength range of 380 nm to 780 nm.

According to another embodiment of the present disclosure, there can be provided a polarizing plate including the anti-reflective film. The polarizing plate may include a polarizer and an anti-reflection film formed on at least one side of the polarizer.

The material and the production method of the polarizer are not particularly limited, and conventional materials and production methods known in the art can be used. For example, the polarizer may be a polyvinyl alcohol-based polarizer.

The polarizer film and the anti-reflective film may be laminated by an adhesive such as an aqueous adhesive or a non-aqueous adhesive.

According to another embodiment of the present disclosure, there can be provided a display apparatus including the above-mentioned anti-reflective film. A specific example of the display apparatus is not limited, and for example, it may be a liquid crystal display (LCD), a plasma display device, or an organic light emitting diode (OLED) device.

In one example, the display apparatus includes a pair of polarizing plates facing each other; a thin film transistor, a color filter, and a liquid crystal cell sequentially stacked between the pair of polarizing plates; and a backlight unit.

In the display apparatus, the anti-reflective film may be provided on the outermost surface of a display panel facing an observer or on the outermost surface thereof facing a backlight.

In the display apparatus including the anti-reflective film, the anti-reflective film may be positioned on one surface of the polarizing plate relatively far from the backlight unit, among the pair of polarizing plates.

In addition, the display apparatus may include a display panel, a polarizer provided on at least one side of the panel, and an anti-reflective film provided on a side opposite to the side of the panel in contact with the polarizer.

Advantageous Effects

According to the present disclosure, there can be provided an anti-reflective film capable of simultaneously realizing high scratch resistance and antifouling property, and increasing a screen sharpness of a display apparatus, a polarizing plate including the anti-reflective film, and a display apparatus including the anti-reflective film.

BRIEF DESCRIPTION OF THE DRAWINGS

FIGS. 1(a) and (b) are photographs of the surfaces of the anti-reflective films of Examples 2 and 3, respectively, taken with an atomic force microscope (AFM).

FIGS. 2(a) and (b) are photographs of the surfaces of the anti-reflective films of Comparative Examples 2 and 3, respectively, taken with an atomic force microscope (AFM).

DETAILED DESCRIPTION OF THE EMBODIMENTS

Hereinafter, the present disclosure will be described in more detail by way of examples. However, these examples are given for illustrative purposes only, and the scope of the present disclosure is not intended to be limited to or by these examples.

Preparation Example 1: Coating Solution for Forming a Hard Coating Layer 16.421 g of pentaerythritol triacrylate, 3.079 g of UA-306T (urethane acrylate series, reaction product of toluene diisocyanate and pentaerythritol triacrylate, manufactured by Kyoeisha), 6.158 g of 8BR-500 (photocurable urethane acrylate polymer, Mw 200,000, manufactured by Taisei Fine Chemical), 1.026 g of IRG-184 (initiator, Ciba), 0.051 g of Tego-270 (leveling agent, Tego), 0.051 g of BYK350 (leveling agent from BYK Chemie GmbH), 25.92 g of 2-butanol, 45.92 g of isopropyl alcohol, 0.318 g of XX-103BQ (copolymer particles of polystyrene and polymethyl methacrylate, manufactured by Sekisui Plastic, particle diameter of 2.0 μm, refractive index of 1.515), 0.708 g of XX-113BQ (copolymer particles of polystyrene and polymethyl methacrylate, manufactured by Sekisui Plastic, particle diameter of 2.0 μm, refractive index of 1.555), and 0.342 g of MA-ST (dispersion in which nano silica particles having a size of 10 to 15 nm are dispersed in methyl alcohol, manufactured by Nissan Chemical, 30% in MeOH) were mixed to prepare a coating solution for forming a hard coating layer.

Preparation Example 2: Preparation of a Coating Solution for Forming a Low Refractive Index Layer The components shown in Table 1 were mixed to prepare a coating solution (C1 to C6) for forming a low refractive index layer.

TABLE 1

| (Unit: g) | C1 | C2 | C3 | C4 | C5 | C6 |
| --- | --- | --- | --- | --- | --- | --- |
| TMPTA | 0.103 | 0.126 | 0.1455 | 0.1068 | 0.1665 | 0.091 |
| Hollow silica particle dispersion (20% in MIBK) | 0.7 | 0.9 | 0.84 | 0.7 | 0.84 | 1.10 |
| Solid silica particle dispersion (40.6% in MIBK) | 0.333 | 0.261 | 0 | 0.333 | 0 | 0 |
| KBM-5103 | 0.084 | 0.054 | 0 | 0.084 | 0 | 0 |
| RS-923 dispersion (40% in MIBK) | 0.0255 | 0.04 | 0.0643 | 0.0179 | 0.0181 | 0.083 |
| Irgacure 127 | 0.005 | 0.03 | 0.02 | 0.005 | 0.02 | 0.02 |
| Methyl isobutyl ketone | 2.87 | 4 | 3.827 | 2.87 | 3.97 | 3.34 |
| Diacetone alcohol | 0.754 | 1.004 | 0.804 | 0.6767 | 0.6486 | 1.045 |
| Isopropyl alcohol | 5.532 | 6.997 | 6.202 | 5.493 | 6.234 | 5.673 |
| 2-butanol | 0 | 0 | 3.20 | 0 | 3.20 | 2.90 |
| t-butanol | 0 | 3.66 | 0 | 3.33 | 0 | 0 |

TMPTA: trimethylolpropane triacrylate
Hollow silica particle dispersion: diameter of about 42 nm to 66 nm, manufactured by JSC Catalyst and Chemicals (20% in MIBK)
Solid silica particle dispersion: diameter of about 12 nm to 19 nm (40.6% in MIBK)
KBM-5103: silane coupling agent, Shin-Etsu Silicone
RS-923 dispersion: fluorine-containing compound, DIC (40% in MIBK), weight average molecular weight of 4450 g/mol
Irgacure 127: photoinitiator, Ciba Examples and Comparative Examples: Preparation of Anti-Reflective Film The coating solution for forming a hard coating layer of Preparation Example 1 was coated onto polyethylene terephthalate substrate (thickness of 2 μm, SRF PET, Toyobo), and dried to form a hard coating layer. The coating solution for forming a low refractive index layer described in Table 1 was coated onto the hard coating layer and dried to prepare an anti-reflective film.

Specifically, the prepared coating solution for forming a hard coating layer was coated onto the polyethylene terephthalate substrate with a #12 Mayer bar, then dried at a temperature of 60° C. for 2 minutes, and UV cured to form a hard coating layer (coating thickness of 5 μm). The UV lamp used an H bulb, and the curing reaction was carried out under a nitrogen atmosphere. The amount of UV light irradiated during curing is 48 mJ/cm$^2$.

The coating solution for forming the low refractive index layer as shown in Table 2 below was coated onto the hard coating layer with a #4 Mayer bar so that the thickness becomes about 110 to 120 nm, dried and cured at a temperature of 90° C. for 1 minute. During the curing, the dried coating solution was irradiated with ultraviolet rays of 294 mJ/cm$^2$ under a nitrogen purge to produce an anti-reflective film.

In addition, the hollow inorganic particle content (V) and the fluorine-containing compound content (F) relative to the total weight of the low refractive index layer formed by each of the coating solutions for forming the low refractive index layer (C1 to C6) were shown in Table 2 below. Further, it was confirmed whether the following Equation 2 was satisfied, and it was indicated either by ○ if the Equation 2 was satisfied, or by X if not satisfied.

$$F \geq 0.26V - 6.11 \quad \text{[Equation 2]}$$

TABLE 2

| | Low refractive index layer | Hollow inorganic particle content (V, wt. %) | Fluorine-containing compound content (F, wt. %) | Whether or not Equation 2 is satisfied |
|---|---|---|---|---|
| Example 1 | Coating solution (C1) | 29.326 | 2.137 | ○ |
| Example 2 | Coating solution (C2) | 35.159 | 3.125 | ○ |
| Example 3 | Coating solution (C3) | 46.768 | 7.160 | ○ |
| Comparative Example 1 | Coating solution (C4) | 29.279 | 1.497 | X |
| Comparative Example 2 | Coating solution (C5) | 46.442 | 2.001 | X |
| Comparative Example 3 | Coating solution (C6) | 60.406 | 9.116 | X |

Measurement and Evaluation

1. Measurement of Fluorine Atom Content on the Surface of the Low Refractive Index Layer The anti-reflective film obtained in the Examples and Comparative Examples was cut into 2 cm×2 cm (width× length), placed on a sample holder and fixed with a clip. Then, the surface of the low refractive index layer was analyzed using an X-ray Photoelectron Spectroscopy (K-Alpha™+XPS system, Thermo Fisher Scientific) equipment, and surveyed using Electron Spectroscopy for Chemical Analysis (ESCA). A narrow scan spectrum was obtained and qualitative and total quantitative analysis was performed. As a result, the content of fluorine atom on the surface of the low refractive index layer was obtained, and shown in Table 3 below.

On the other hand, the surface of the low refractive index layer means "within a thickness of 10 nm in the thickness direction of the low refractive index layer from one surface of the low refractive index layer (e.g., one surface of the low refractive index layer in contact with an air layer)", and the content of fluorine on the surface of the low refractive index layer means a content of fluorine element relative to the total atomic content of elements existing within a thickness of 10 nm in the thickness direction of the low refractive index layer from one surface of the low refractive index layer (for example, one surface of the low refractive index layer in contact with an air layer).

2. Measurement of Surface Area Difference Percentage (SADP) and Centerline Average Roughness (Ra)

In order to measure the surface shape of the anti-reflective film obtained in Examples and Comparative Examples, an atomic force microscope (Park Systems, XE7) was used. Specifically, the specimen was cut into 0.8 cm×0.8 cm (width×length) and attached to a sample stage using a carbon tape. The flat part was observed with an atomic force microscope. PPP-NCHR 10 (Force constant: 42 N/m, Resonance Frequency 330 kHz) was used as a tip for measurement, and detailed measurement conditions are as follows.

x-scan size: 1 μm, y-scan size: 1 μm
Scan rate: 0.7 to 1 Hz Z Servo Gain: 1
Set Point: 10 to 15 nm The data measured under the above conditions were patterned using a XEI program, and executed under the following conditions.

Scope: Line, Orientation: X and Y axis
Regression order: 1

From the analyzed data, the surface area difference percentage and the centerline average roughness (Ra) were derived. In particular, the surface area difference percentage was calculated by substituting the two-dimensional/three-dimensional area in the following Equation 1, and the results are shown in Table 3 below.

$$\text{Surface area difference percentage (\%)} = ((\text{three-dimensional area} - \text{two-dimensional area})/(\text{two-dimensional area})) \times 100 \quad \text{[Equation 1]}$$

Figure 1:
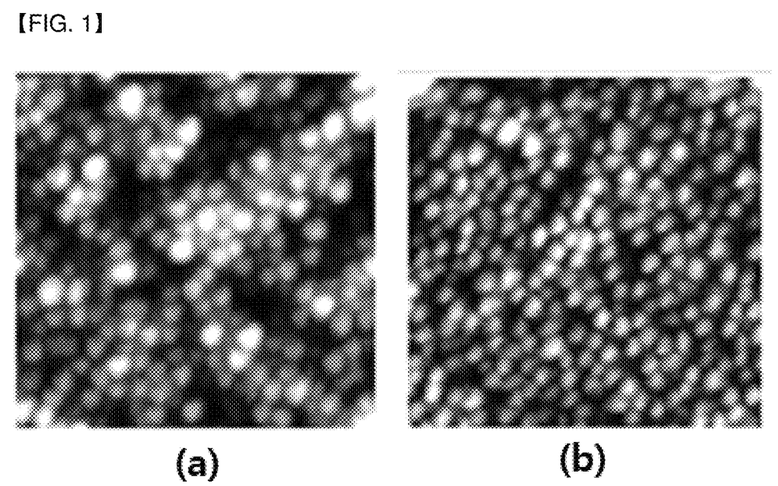
Figure 2:
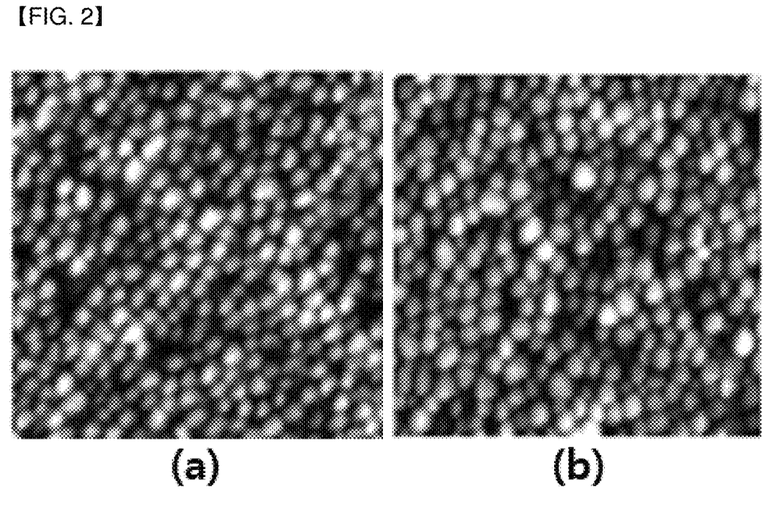

On the other hand, FIGS. 1(a) and (b) are photographs of the surfaces of the anti-reflective films of Examples 2 and 3, respectively, taken with an atomic force microscope (AFM), and FIGS. 2(a) and (b) are photographs of the surfaces of the anti-reflective films of Comparative Examples 2 and 3, respectively, taken with an atomic force microscope.

3. Evaluation of Average Reflectance

For the anti-reflective films obtained in Examples and Comparative Examples, the average reflectance shown at a visible light range (380 to 780 nm) was measured using Solidspec 3700 (SHIMADZU), and the results are shown in Table 3 below.

4. Evaluation of Antifouling Property

On the surface of the anti-reflective film obtained in the Examples and Comparative Examples, straight lines were drawn with a load of 50 g using Monami name black pen (for intermediate characters), and the interval between dewetting droplets formed using an optical microscope (Olympus, BX51) was measured 10 times or more, and the antifouling properties were judged based on the following criteria through the arithmetic mean value. The results are shown in Table 3 below.

<Judgment Criteria>

○: The arithmetic mean value of the intervals between dewetting droplets exceeds 200 μm Δ: The arithmetic mean value of the intervals between dewetting droplets is 200 μm or less and more than 50 μm X: The arithmetic mean value of the intervals between dewetting droplets is 50 μm or less, or no dewetting

TABLE 3

| | Fluorine content (atomic %) | Surface area difference percentage (%) | Centerline average roughness (Ra, nm) | Average reflectance (%) | Antifouling property |
|---|---|---|---|---|---|
| Example 1 | 8.9 | 1.2 | 1.72 | 1.39 | ○ |
| Example 2 | 11.3 | 2.36 | 2.87 | 1.37 | ○ |
| Example 3 | 16.2 | 13.28 | 2.996 | 1.25 | ○ |
| Comparative Example 1 | 7.3 | 1.27 | 1.75 | 2.23 | Δ |
| Comparative Example 2 | 8.0 | 13.27 | 3.1 | 1.43 | X |
| Comparative Example 3 | 15.5 | 21.13 | 5.04 | 1.16 | Δ |

According to Table 3, it was confirmed that Examples 1 to 3 had a fluorine atom content of more than 8.0 atomic % on the surface of the low-refractive layer, a surface area difference percentage of less than 20% and a centerline average roughness of 10 nm or less, whereby the average reflectance was as low as 1.41% or less, and the antifouling property was remarkably excellent compared to Comparative Examples 1 to 3.

What is claimed is:

1. An anti-reflective film comprising a hard coating layer; and a low refractive index layer containing a fluorine-containing compound and hollow inorganic particles, wherein a content of the fluorine-containing compound relative to the total weight of the low refractive index layer is 2 to 9% by weight, and a content of the hollow inorganic particles relative to the total weight of the low refractive index layer is 29 to 60% by weight, wherein a content of a fluorine atom existing on a surface of the low refractive index layer is more than 8.0 atomic %, wherein a surface area difference percentage (SADP) of one surface of the low refractive index layer is 20% or less, and wherein the anti-reflective film satisfies the following Equation 2, $$F \geq 0.26V - 6.11 \quad \text{[Equation 2]}$$

wherein F is the content of the fluorine-containing compound and V is the content of the hollow inorganic particles.

2. The anti-reflective film of claim 1, wherein a centerline average roughness (Ra) of the anti-reflective film is 10 nm or less.

3. The anti-reflective film of claim 1, wherein the surface area difference percentage (SADP) is defined by the following Equation 1, $$\text{Surface area difference percentage (\%)} = ((\text{three-dimensional area} - \text{two-dimensional area})/(\text{two-dimensional area})) \times 100 \quad \text{[Equation 1]}.$$

4. The anti-reflective film of claim 1, wherein the content of fluorine atom is a content of fluorine atom relative to the total content of atoms existing within a thickness of 10 nm in the thickness direction of the low refractive index layer from one surface of the low refractive index layer.

5. The anti-reflective film of claim 1, wherein the fluorine-containing compound has a reactive functional group.

6. The anti-reflective film of claim 1, wherein the anti-reflective film has an average reflectance of 2% or less in a visible light wavelength range of 380 nm to 780 nm.

7. The anti-reflective film of claim 1, wherein a content of fluorine atom contained in the fluorine-containing compound is 1 to 60% by weight.

8. The anti-reflective film of claim 1, wherein the low refractive index layer further includes a (co)polymer of a photopolymerizable compound.

9. The anti-reflective film of claim 1, wherein the low refractive index layer further includes a cross-linked polymer of a photopolymerizable compound, the fluorine-containing compound, and a polysilsesquioxane substituted with one or more reactive functional groups.

10. The anti-reflective film of claim 1, wherein the hard coating layer includes a binder resin including a photocurable resin; and organic or inorganic fine particles dispersed in the binder resin.

11. A polarizing plate comprising the anti-reflective film according to claim 1 and a polarizer.

12. A display apparatus comprising the anti-reflective film according to claim 1.

* * * * *